United States Patent [19]

Paul et al.

[11] Patent Number: 5,325,889
[45] Date of Patent: Jul. 5, 1994

[54] LAMINATED CONDUIT PLATE FOR FLUID DELIVERY SYSTEM

[75] Inventors: Carlton H. Paul, Groton; Russell L. Keene, Jr., Sudbury, both of Mass.

[73] Assignee: Millipore Corporation, Bedford, Mass.

[21] Appl. No.: 40,321

[22] Filed: Mar. 30, 1993

[51] Int. Cl.⁵ .............................................. F16K 27/00
[52] U.S. Cl. .................................... 137/594; 137/606; 251/367
[58] Field of Search ............... 137/606, 884, 607, 594; 251/367

[56] References Cited

U.S. PATENT DOCUMENTS

| | | | |
|---|---|---|---|
| 3,057,551 | 10/1962 | Etter | 251/367 X |
| 3,527,248 | 9/1970 | Western-Pick | 251/367 X |
| 3,765,441 | 10/1973 | Chang | 137/884 X |
| 3,881,513 | 5/1975 | Chang | 251/367 X |
| 5,095,938 | 3/1992 | Garrison | 137/597 |

*Primary Examiner*—Stephen M. Hepperle
*Attorney, Agent, or Firm*—Andrew T. Karnakis; Paul J. Cook

[57] ABSTRACT

A laminated plate structure including conduit and regent delivery means for a fluid delivery system is provided to deliver precise volumes of a plurality of fluids in sequence to a treatment reservoir. Fluid channels are formed in the plate structure to provide a means for delivering fluids from a plurality of fluid reservoirs attached to the plate structure to one or a plurality of treatment reservoirs attached to the plate structure. Each fluid is delivered by a system comprising a fluid reservoir, an inlet valve in fluid communication with the fluid reservoir, a positive displacement pump in fluid communication with the inlet valve and an outlet valve in fluid communication with the positive displacement pump all of which are attached to the plate structure. The means for delivering fluid and the fluid reservoirs are positioned on opposing surfaces of the plate structure. The plate structure is provided with vent holes for venting vapors that may be produced during formation of the plate structure.

17 Claims, 9 Drawing Sheets

LAMINATED CONDUIT PLATE FOR FLUID DELIVERY SYSTEM

BACKGROUND OF THE INVENTION

This invention relates to a plate structure for use in fluid delivery system for delivering a plurality of fluids, in sequence to a treatment reservoir.

Prior to the present invention, fluid delivery systems have been available which minimize intermixing of fluids while delivering a precise amount of a fluid for chemical reaction. These systems are generally utilized for chemical processes involving a large number of sequentially effected chemical reactions such as in peptide synthesis, DNA synthesis or when sequencing proteins.

U.S. Pat. No. 4,008,736 discloses a valve block containing a capillary formed of capillary segments bored at about 30° from a contact surface of the block. The junctions of the capillary segments are effected at the contact surface and within the block. The junctions at the contact surfaces form valving sites to which are engaged apertured sliding blocks which effect fluid communication with the capillary. While the sliding blocks are effective in providing the desired fluid flow, they wear too rapidly thereby causing undesirable leaks.

U.S. Pat. No. 4,168,724 discloses a similar device but replaces the slider valves with diaphragm valves. The fluid is delivered through the valves from a pressurized fluid storage source. This system requires a vacuum assist to open the valves. This system is undesirable because the type of diaphragm valve used is susceptible to particulate contamination. The pressure drop through the valves is difficult to control which causes less accurate reagent delivery.

U.S. Pat. No. 4,558,845 discloses a fluid delivery system utilize a valve block assembly comprising a separate block for each valve site. The common conduit to the reaction site is alternatively a channel in a block and tubing connecting two adjacent blocks. This arrangement requires a plurality of fittings which are subject to leaking.

U.S. Pat. No. 4,773,446 discloses a valve block assembly which utilizes diaphragm valves. The valves serve to control fluid flow from a plurality of pressurized fluid reservoirs, in sequence to a common outlet reservoir. This system requires the use of conduits from the fluid reservoirs and fittings to valve blocks for each conduit. These fittings are subject to leakage. The fluid delivery systems of the prior art depend upon the use of positive pressure to deliver the fluid and upon the control of back pressure of the fluid reservoir in order to precisely control the amount of fluid delivered to a treatment reservoir. These systems require the frequent adjustment of the fluid delivery means as a function of back pressure. All of the systems set forth above depend upon the precise control of reservoir pressure and restriction through the tubing, channels and valves to control reagent delivery volume. They are very sensitive to variations of the removable reaction columns as regards the delivery volume and flow rate. Also, these systems deliver fluids against back pressures only up to about 10 psig.

Copending U.S. application Ser. No. 07/655,012, filed Feb. 14, 1991, and entitled "Conduit Plate for Fluid Delivery System" discloses a conduit plate for a fluid delivery system comprising four or five layers laminated together, including a plurality of notched openings for attaching external fluid processing components in fluid communication with the plate; and a single fluid conduit layer for effecting passage of fluids between different points on the solid plate. The plate, preferentially is formed of a ceramic material. A plurality of fluids are delivered in sequence to a desired point by means of a plurality of pumps, each comprising a diaphragm member, an injector (a passive outlet check valve), and a passive inlet check valve. The notched openings in the plate address a problem inherent in the manufacture of the solid plate wherein the dimensional tolerances of the solid plate are comparable or larger then the dimension of the passage within the plate so that mating parts can be aligned accurately only insofar as the plate itself serves to key the positions of external components mating to the plate. However, direct attachment of components to the solid plate places the solid plate under tensional forces that may cause breakage. The presence of a single conduit layer in the solid plate results in unique layout of fluid passages in the plate because passages cannot cross each other, an revisions in the fluid path are correspondingly made more difficult. Apparatus which utilize these plates are disclosed in U.S. Pat. Nos. 5,095,932; 5,095,938; 5,111,845 and 5,123,443.

It would be desirable to provide a system which eliminates the need of adjustment of the fluid delivery means. It would also be desirable to utilize a means to deliver accurate fluid volumes which is insensitive to back pressure. Such a system would result in improved system performance and reduced reagent consumption. It would also be desirable to provide a fluid delivery system which minimizes the use of tubes and tube fittings while minimizing the volume of the system as compared to presently available systems. In addition, it would be desirable to provide a fluid delivery plate which can be easily formed, defect free, which does not include easily frangible portions and which can have a reduced size as compared to plates of the prior art.

SUMMARY OF THE INVENTION

The present invention provides a plate structure for delivering a plurality of fluids in sequence to a treatment reservoir wherein a chemical reaction or a physical treatment step occurs. The plate structure comprises three or more layers preferably made of a ceramic composition laminated together. For convenience, this invention will be described herein with reference to the embodiment utilizing five layers. Two outer layers which comprise opposing surfaces provide connecting holes for apparatus which effect fluid delivery. Two conduit layers are each positioned against one of the outer layers. The conduit layers each are provided with holes and parallel slots, which serve as conduits, with the direction of the slots in one conduit layer being in a direction different from the direction in which the slots extend in the second conduit layer. The conduit layers are separated from each other by an inner layer. Connecting holes connect selected slots in the conduit layers. The conduit layers are preferably structure with parallel slots within the layer to avoid the formation of cantilevers, and to prevent interference between different channels. It is preferred that the slots or conduits in one conduit layer extend in a direction perpendicular to the direction in which the slots extend in the second conduit layer. Arbitrary conduit networks can be routed between different points in the plate without interference by bridging back and forth between the conduit layers. In one embodiment of this invention, the inner layer and both of the conduit layers can be formed as a single piece so that the structure comprises only three layers. In the embodiment wherein three layers are utilized, the inner layer can be eliminated and the two conduit layers can be formed in one layer. If the channels in one plate do not intersect with each other layer, the inner (third) layer can be eliminated and the two conduit layers are configured such that conduits positioned at different from each other, e.g., orthogonally, do not interact with each other.

Each of the layers can be provided with a field of vent holes which are positioned to permit venting of vapors when forming the structure while avoiding interruption of fluid flow during use of the structure. In one embodiment, one layer has no field of venting holes, thereby reducing communication between opposing surfaces of the composite plate in the event of leakage. External components can be connected to both faces of the plate structure, thereby increasing the component density (and halving the size of the solid plate) and decreasing the length of interconnecting passages within the solid plate as compared to a plate structure wherein the external components are on only one surface. The external components preferentially are arranged on a regular grid to simplify the layout and alignment of parts in the final assembly. Alternatively, the external components can be positioned on one surface of the plate structure.

DESCRIPTION OF SPECIFIC EMBODIMENTS

In accordance with this invention, a fluid delivery system is provided which comprises a solid containing conduits and fluid transport means for effecting fluid passage through the conduits. The system is constructed to effect transport of a plurality of fluids sequentially from a plurality of fluid reservoirs to at least one treatment reservoir. The means for transporting each fluid comprises a diaphragm member in fluid communication with two electrically or pneumatically controlled gates. One gate is connected to a source of fluid and is in fluid communication with the diaphragm pump and the second gate which, in turn is in fluid communication with a reaction column. The system of this invention is particularly suitable for use in processes under carefully controlled conditions. Examples of such processes include synthesis of biopolymers such as nucleic acids, peptides or carbohydrates. These processes require sequential chemical reactions which are alternated with washing steps to remove excess unreacted reagent. In some instances, the reagents require a particular atmospheric environment such as inert environment or an oxidizing environment. In these instances, gases are provided to the fluid reservoir. Therefore, these processes require fluid delivery systems wherein reagent, processing chemicals and gases are processed in a precise manner so that precise volumes of fluid are delivered to the appropriate destination within the system at the proper time and within the proper sequence. When a plurality of treatment reservoirs are utilized, switching means comprising the diaphragm member and two electrically or pneumatically controlled gates are provided to direct the appropriate reagent, process chemical or gas to the appropriate treatment reservoir. The plate of this invention contains the conduits for fluid transport formed from a plurality of thinner ceramic plates laminated together by application of very high temperatures. Each of the thinner component plates can be fabricated by a photolithographic process wherein a specified pattern is imprinted with ultraviolet light in the component layer by means of a mask followed by selective etching of the exposed ceramic surfaces to create the specified pattern desired in the component plate.

The plate structure of this invention is formed from three or more layers laminated together by raising the temperature of an aligned stack of thinner plates to a high temperature in a furnace. Each of the plates in the stack is provided with a field of vent holes which are aligned with the field of vent holes of all of the other plates in the stack. The vent holes do not intersect with conduits for fluids within the stack. The function of the vent holes is to vent vapors which may form during the high temperature lamination step thereby to prevent incomplete lamination. In one embodiment, the field of venting holes is omitted from one of the layers to reduce communication between the top and bottom surfaces of the composite plate in the event of leakage.

Figure 1:
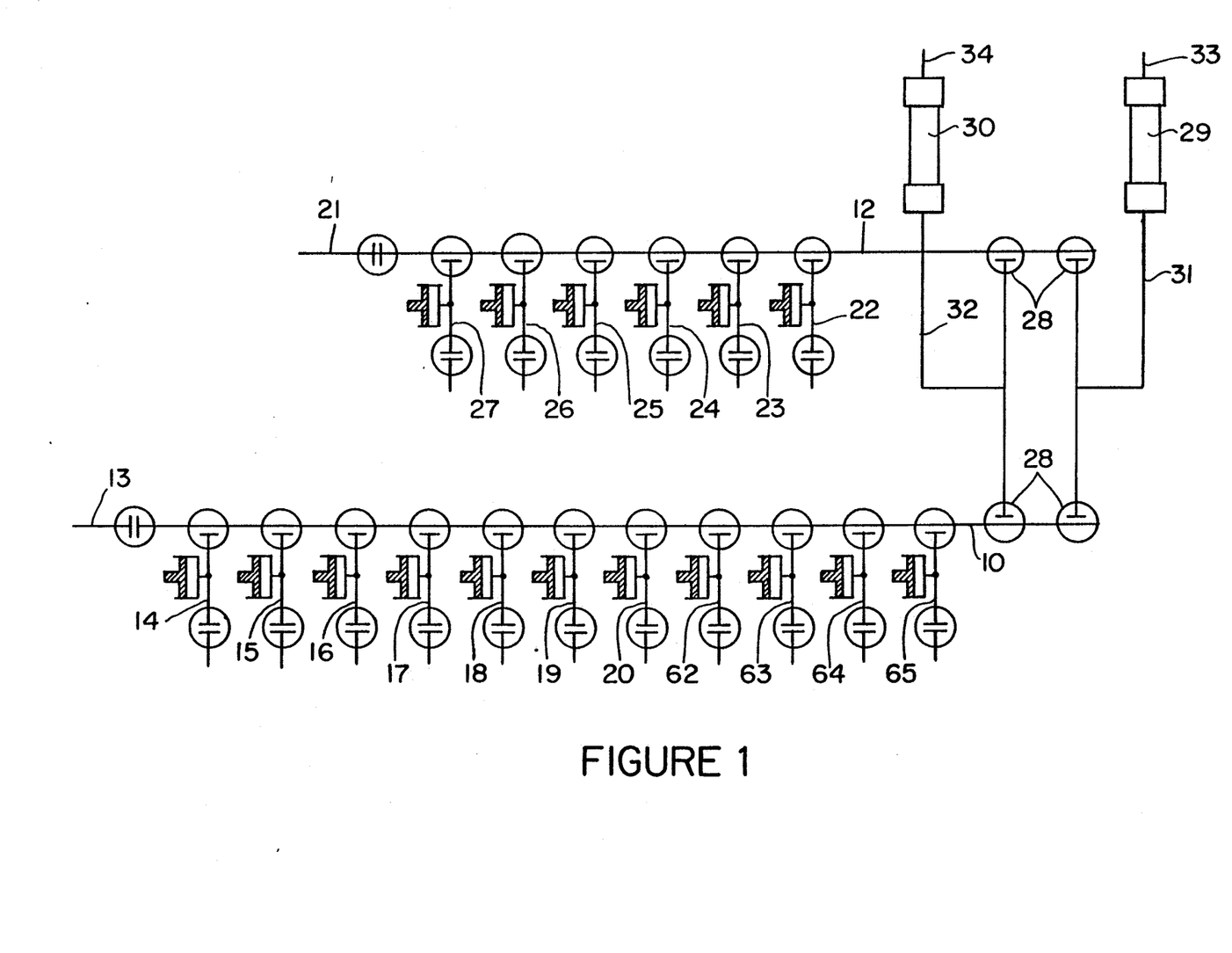
FIG. 1 is a schematic view of a system useful for producing DNA and utilizing the invention.

The system of the invention will be described specifically, for convenience with reference to a process for producing polymeric nucleic acids (NA). Referring to FIG. 1, a process for shown schematically. The process shown utilizes two sets of fluid reagents with one set in fluid communication with common channel 10 and a second set in fluid communication with common channel 12. The first set includes a gas flow-through means for purging the system (Gas B) connected to channel 13, acetonitrile (ACN-B) connected to channel 14, tetrazole (TET) connected to channel 15, an auxiliary reservoir connected to channel 16, guanosine (g) connected to channel 19, auxiliary reservoir connected to channel 17, auxiliary reservoir connected to channel 18, auxiliary reservoir connected to channel 19, auxiliary reservoir connected to channel 20, thymidine (T) connected to channel G 2, cytidine (C) connected to channel 63, guanosine (G) connected to channel 64 and adenosine (A) connected to channel 65. The second set of fluids includes a gas flow-through means for purging the system (GAS-A) connected to channel 21, acetonitrile (ACN-A) connected to channel 27, capping solution A (CAP-A) connected to channel 26, capping solution B (CAP-B) connected to channel 25 oxidizer (OXI)

connected to channel 23, dicholoroacetic acid (DCA) connected to channel 22 and auxiliary oxidation reagent reservoir (OX2) connected to channel 24. The reagents, adenosine, cytidine, guanosine and thymidine are reagents used to form the DNA as is well known in the art. GAS-A provides the function of purging the system and transporting small volumes of liquid out of the system to a detector. GAS-B provides the same function as GAS-A. Acetonitrile provides the function of rinsing the system. Acetic anhydride (CAP-A) and N-methyl- imidazole (CAP-B) provides the function of terminating unreacted sites to prevent further elongation of the failed sequence. OXI and OX2 such as iodine in water and pyridine provides the function of oxidizing the elongated polymeric chain to stabilize the internucleotide phosphate linkages. DCA provides the function of deprotecting the bound residue to permit further condensation reaction. TET provides the function of activating the reactive monomer for the next coupling reaction. Partition valve 28 serves as a switch to direct fluid from either channel 10 or channel 12 to either treatment reservoir 29 comprising a reaction column containing a solid support such as controlled pore glass (CPG) or a membrane through channel 31 or treatment column 30 which is a duplicate of column 29 through channel 32. Channels 33 and 34 direct processed fluid to waste or a detector.

Figure 2:
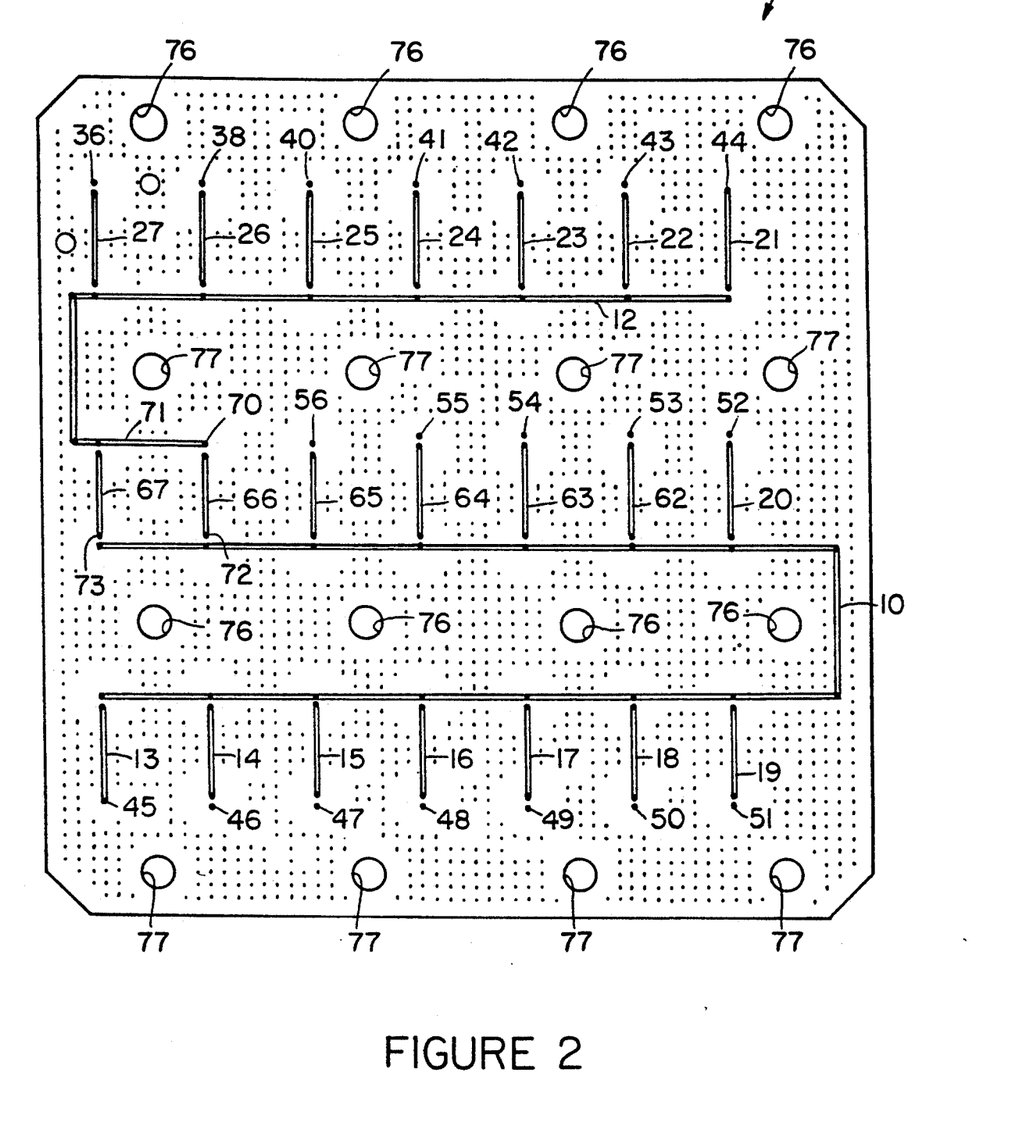
FIG. 2 is a top view of all five layers of FIGS. 1a, 1b, 1c, 1d and 1e aligned in the configuration of the final solid plate structure.

FIG. 2 shows the plate holes and arrangement of conduits for processing fluids through the plate structure 11. The conduits include the A train 12 and the B train 10. Conduit 27 is a conduit connected to an auxiliary reservoir through tubing (not shown) and hole 36 (FIG. 2). Conduit 26 is a conduit connected to a container for dichloroacetic acid through tubing (not shown) and hole 38. Conduit 25 is a conduit for an oxidizer from a container through tubing (not shown) and hole 40. Conduit 24 is a conduit for N-methylimidazole from a container through tubing (not shown) and hole 41. Conduit 23 is a conduit for acetic anhydride from a container through tubing (not shown) and hole 42. Conduit 22 is a conduit for acetonitrile from a container tubing (not shown) and hole 43. Conduit 21 is a conduit for purging gas from a container through tubing (not shown) and hole 44. Conduit 13 is a conduit for a purging gas to be introduced through hole 45. Conduit 14 is a conduit for acetonitrile from a container through tubing (not shown) and hole 46. Conduit 15 is a conduit for tetrazole from a container through tubing (not shown) and hole 47. Conduit 16 is a conduit for a reagent from an auxiliary reservoir from a container through tubing (not shown) and the hole 48. Conduit 17 is a conduit for adenosine from a container through tubing (not shown) and the hole 49. Conduit 18 is a conduit for cytidine from a container through tubing (not shown) and the hole 50. Conduit 19 is a conduit for guanosine from a container through tubing (not shown) and the hole 51. Conduit 20 is a conduit for thymidine from a container through tubing (not shown) and the hole 52. Conduit 62 is a conduit for thymidine from a container through tubing (not shown) over the hole 53. Conduit 63 is a conduit for cytidine from a container through tubing (not shown) and the hole 54. Conduit 64 is a conduit for guanosine from a container through tubing (not shown) the hole 55. Conduit 65 is a conduit for adenosine from a container through tubing (not shown) over the hole 56.

Figure 1A:
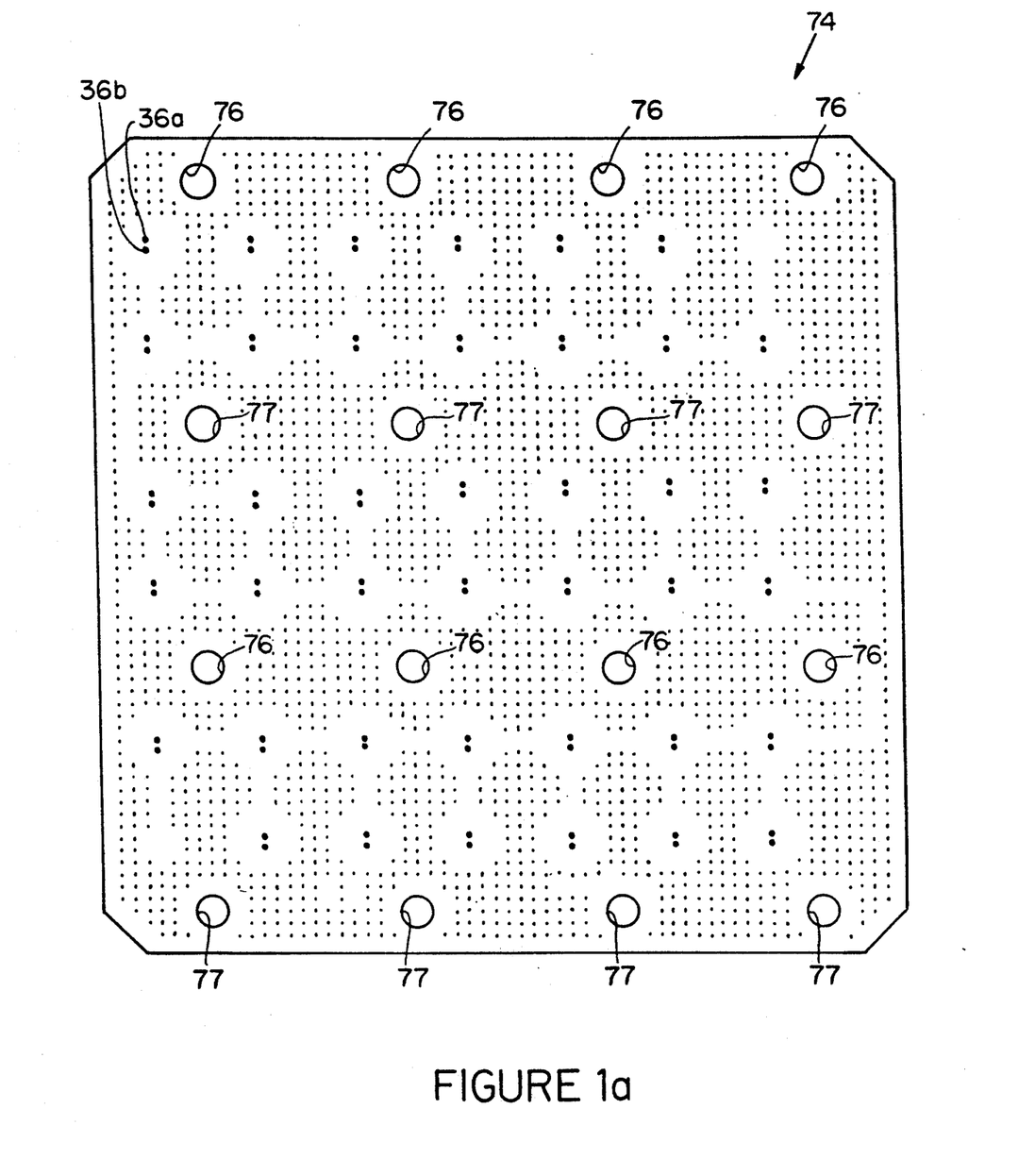
FIG. 1a is a view of the top layer of the plate structure of this invention.
Figure 1B:
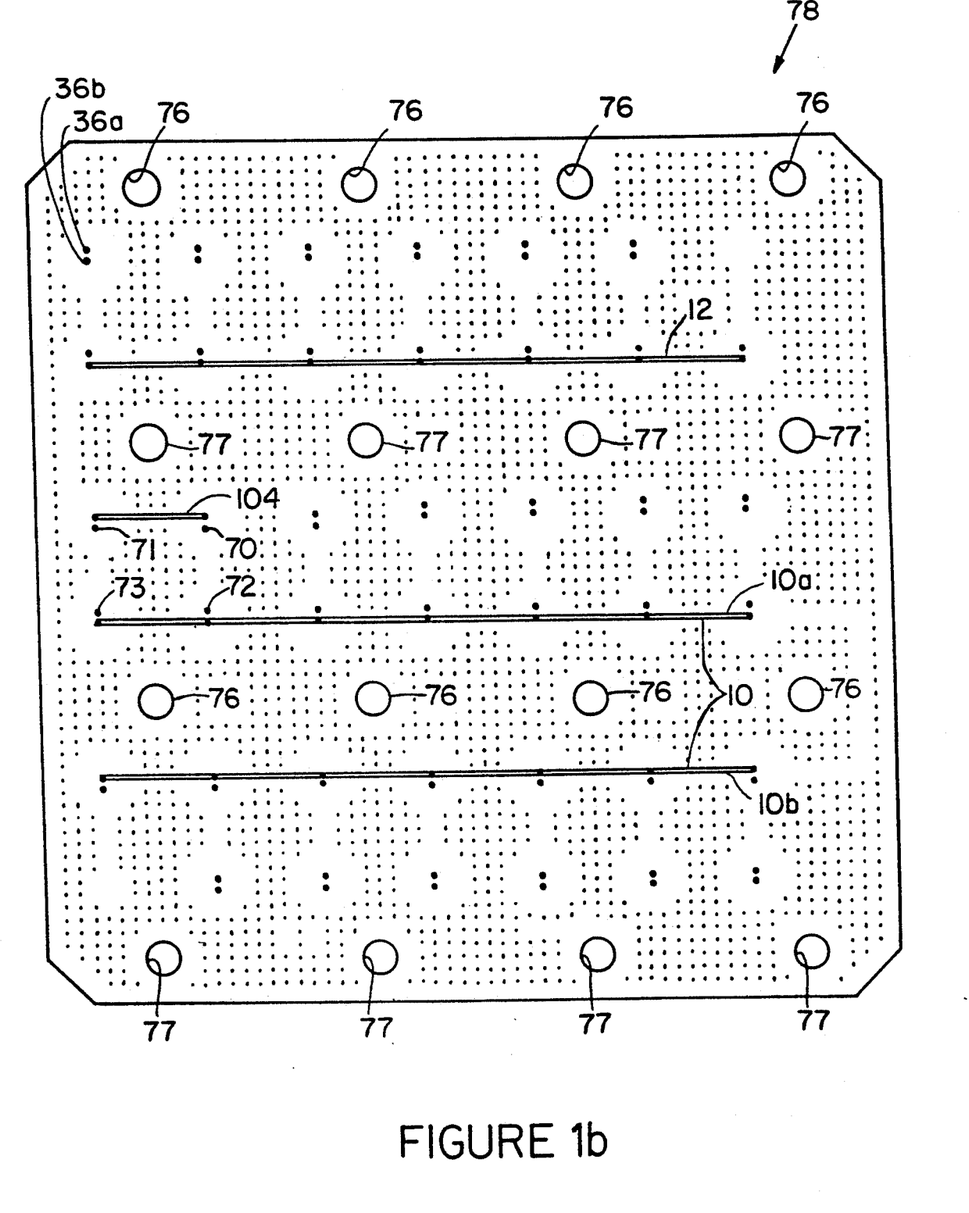
FIG. 1b is a view of a first conduit layer of the plate structure of this invention.
Figure 1C:
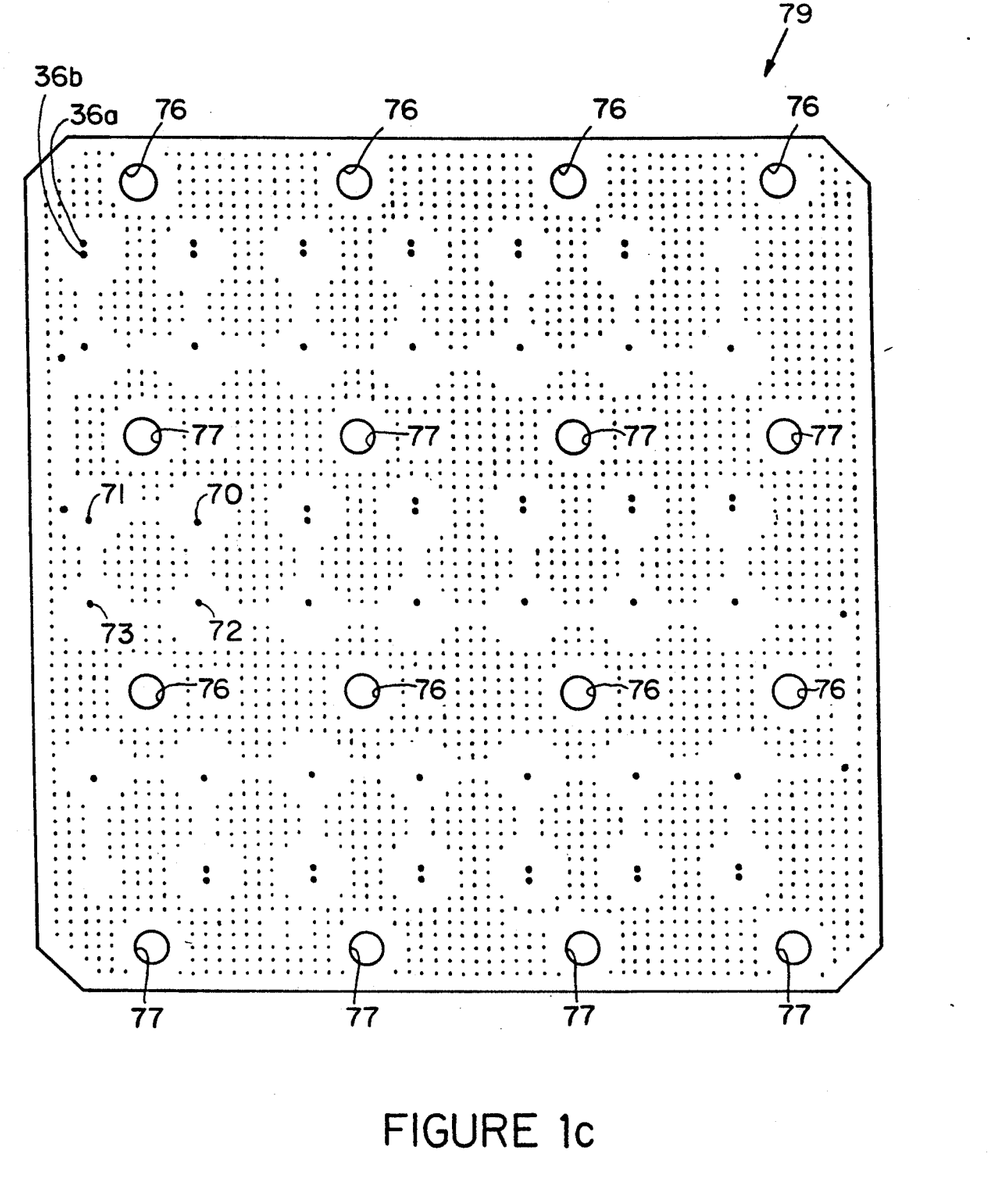
FIG. 1c is a view of the communication or inner layer of the plate structure of this invention.
Figure 1D:
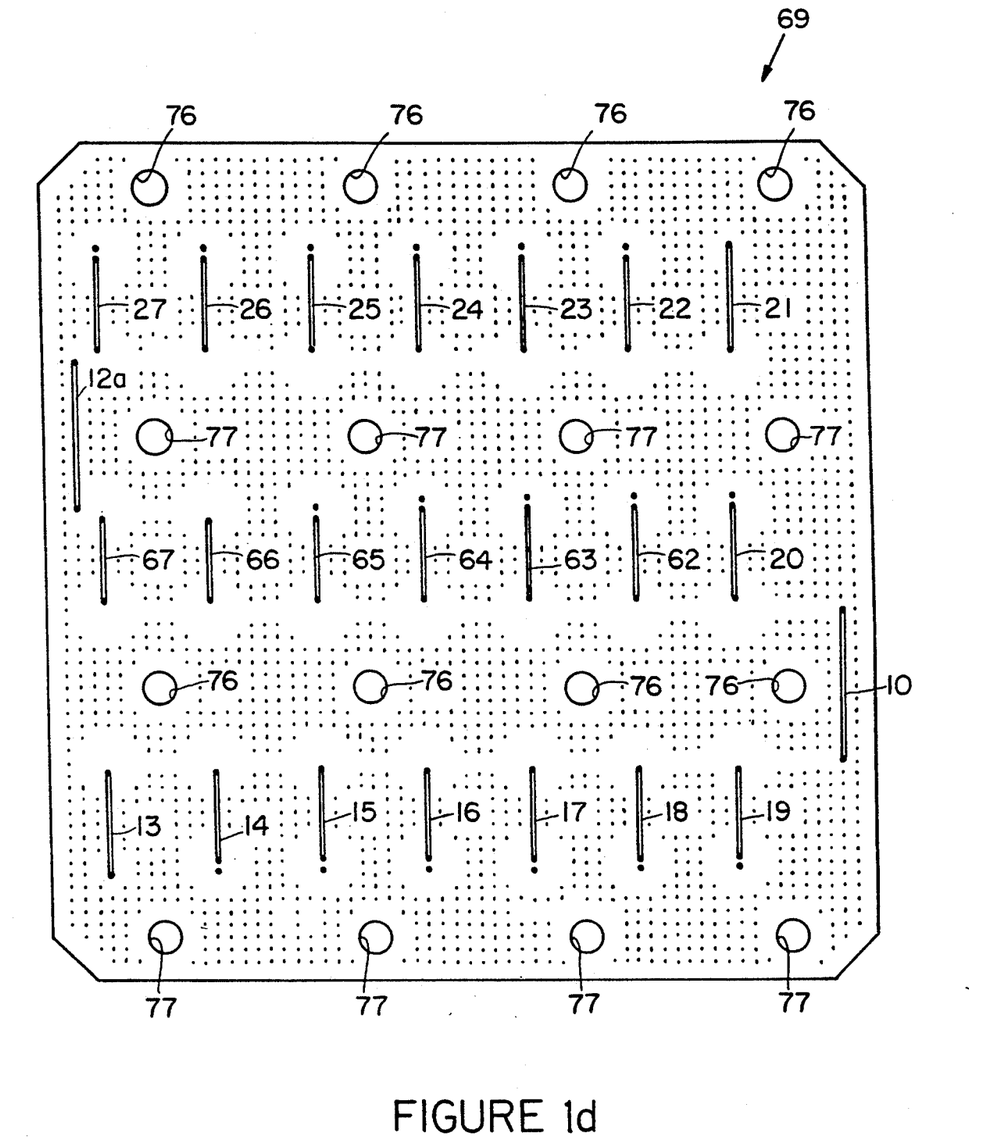
FIG. 1d is a view of a second conduit layer of the structure of this invention.
Figure 1E:
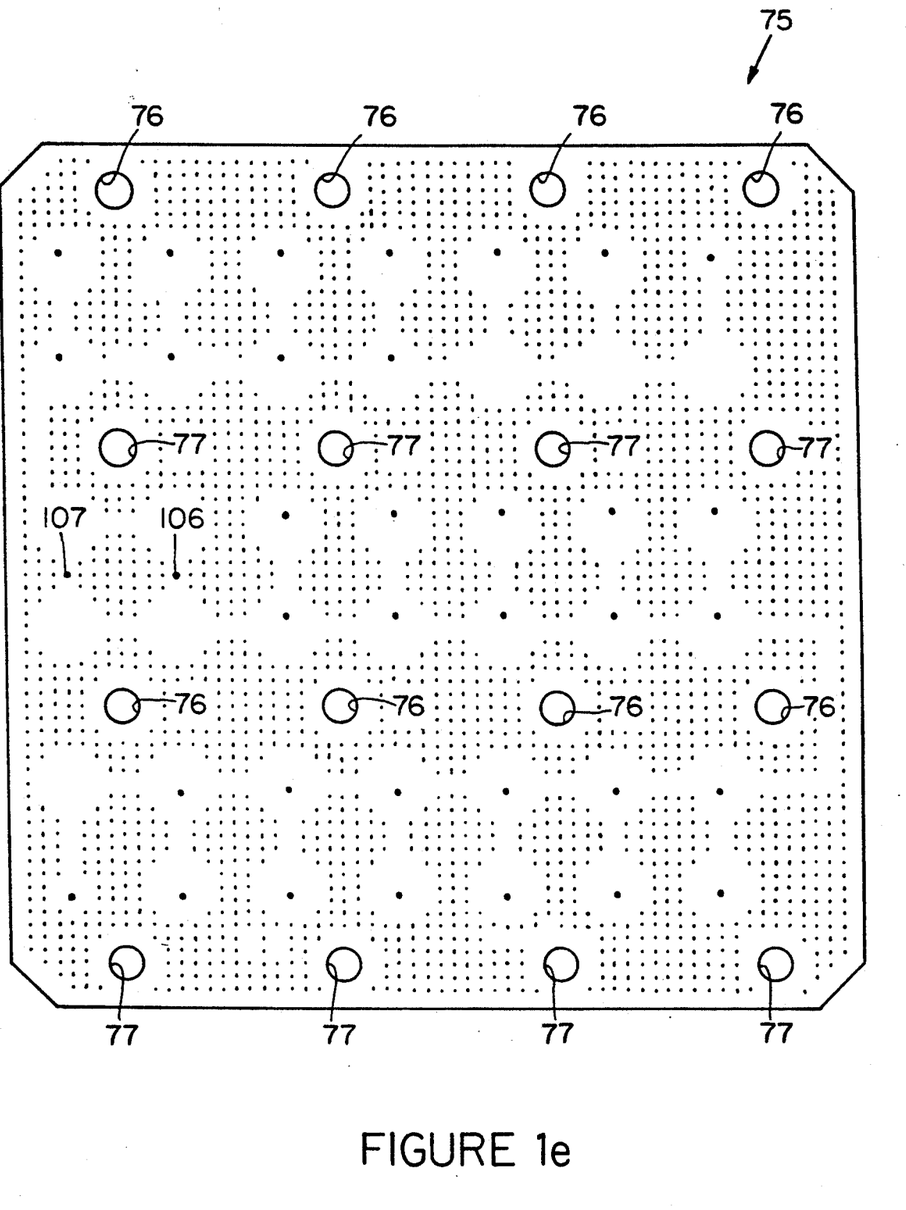
FIG. 1e is a view of the bottom layer of the plate structure of this invention.
Figure 3:
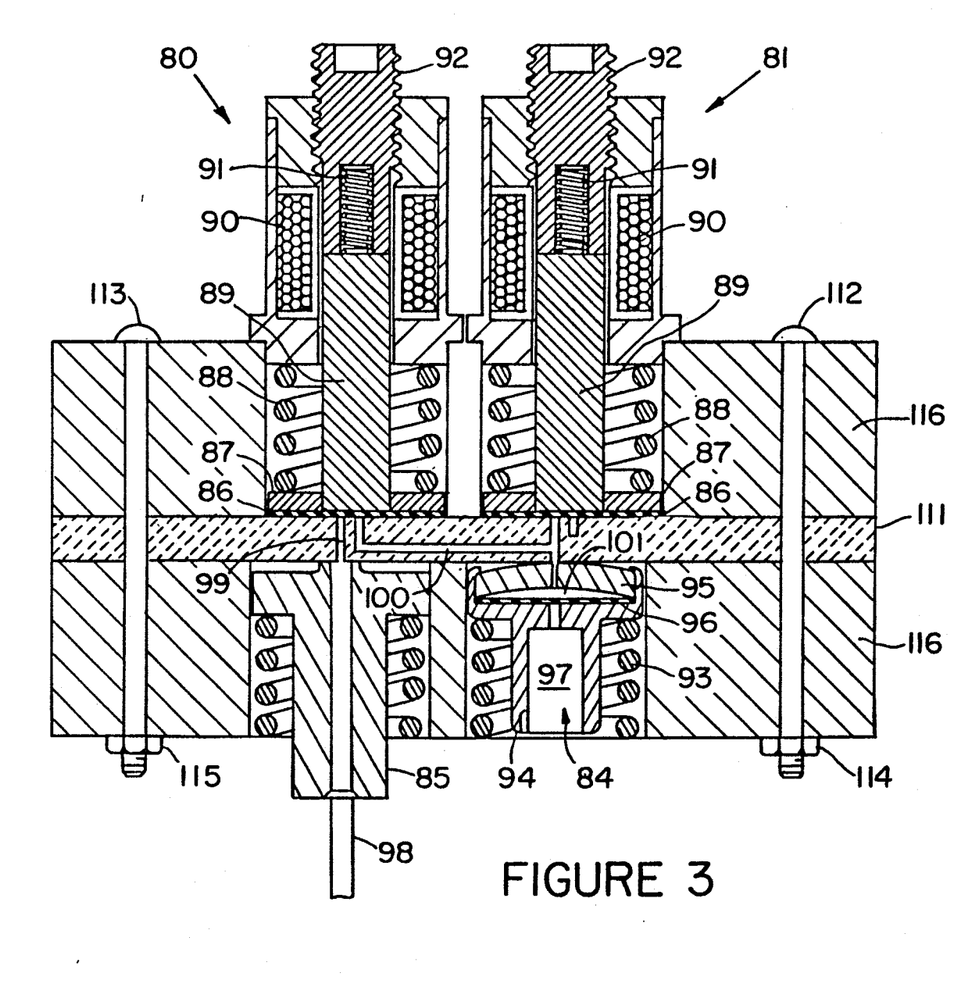
FIG. 3 is a cross-sectional view of a fluid pimping means useful with the plate structure of this invention.

The partition valve 28 serves to direct reagent from either the A-Train 12 or the B-Train 10 to a reaction column positioned over holes 70, 71, 72, or 73. The hole arrangements and their function for the outer plates shown in FIGS. 1a and 1e are best described with reference to FIG. 3. The plate 74 shown in FIG. 1a has a plurality of adjacent holes, exemplified by holes 36a and 36b, each set being used in conjunction with a solenoid or pneumatic valve 80 or 81 shown in FIG. 3. The remainder of the sets of adjacent holes are not labeled for convenience, but function in the same manner as holes 36a and 36b. The plate 75 having single spaced apart holes shown in FIG. 1e is used in conjunction with a diaphragm pump 84 and a source of fluid to be transported 85. The solenoid valve 81 comprises an outlet valve while the solenoid valve 80 comprises an inlet valve. The solenoid valves 80 and 81 each include a diaphragm 86, a thrust washer 82, a spring 88 and an armature 89. The upper portions of the solenoid valves 80 and 81, include a coil 90, a spring 91 and an adjustable stop 92. The diaphragm pump 84 is a positive displacement pump and comprises a spring 93, a top inset member 94, a bottom insert member 95, and a diaphragm 96. The insert members 94 and 95 are crimped together to secure the diaphragm 96. Insert 94 contains a cavity 97 to connect to a fluid source which can be opened or closed to alternately apply or remove a pressure on the top surface of diaphragm 96. Fluid to be transported enters port 98 and channel 99 when diaphragm 86 of solenoid valve 80 is opened. When diaphragm 96 of pump 84 is opened and diaphragm 86 of valve 80 is closed, fluid passes through channel 100 into plenum 101 of pump 84. When diaphragm 86 of valve 80 and diaphragm 96 of pump 84 are closed and diaphragm 86 of valve 81 is open, fluid passed into channel 100. When diaphragm 96 of valve 84 is closed and diaphragm 86 of valve 81 is closed, fluid passes into channel 12 in the case of the A Train or channel 10 in the case of the B Train (See FIG. 1). The valves 80 and 81, diaphragm pump 84 and fluid delivery part 85 are secured to plate structure 11 by means of bolts 112 and 113 and nuts 114 and 115 which extend through holes in metal plates 116 and 117 and holes 76 and 77 (FIGS. 1a–1e) in plate structure 11. The plate layer 78 shown in FIG. 1b includes horizontal conduits 12, 10a and 10b for the A Train and B Train conduits as well as horizontal conduit 104 which services the partition valve 28. The holes shown in FIG. 1b are aligned with the same numbered holes in the remainder of the plate layers shown in. The plate layer 79 shown in FIG. 1c separates the plate layers shown in FIGS. 1b and 1d. The numbered holes are aligned with the same numbered holes in the other plate layers. The plate layer 1c serves to provide selective fluid communication between the conduits shown in FIGS. 1b and 1d by way of the hole pairs and holes shown such as holes 36a and 36b. The plate layer 69 shown in FIG. 1d includes the vertical conduits 13 through 27, 62 through 65 and 12a for fluid reagent delivery and vertical conduits 66 and 67 which cooperate with partition valve 28. The plate layer shown in FIG. 1e includes exit ports 106 and 107 which deliver fluid from partition valve 28 on the plate structure 11 to a reaction column 29 or 30 (FIG. 1).

Figure 4:
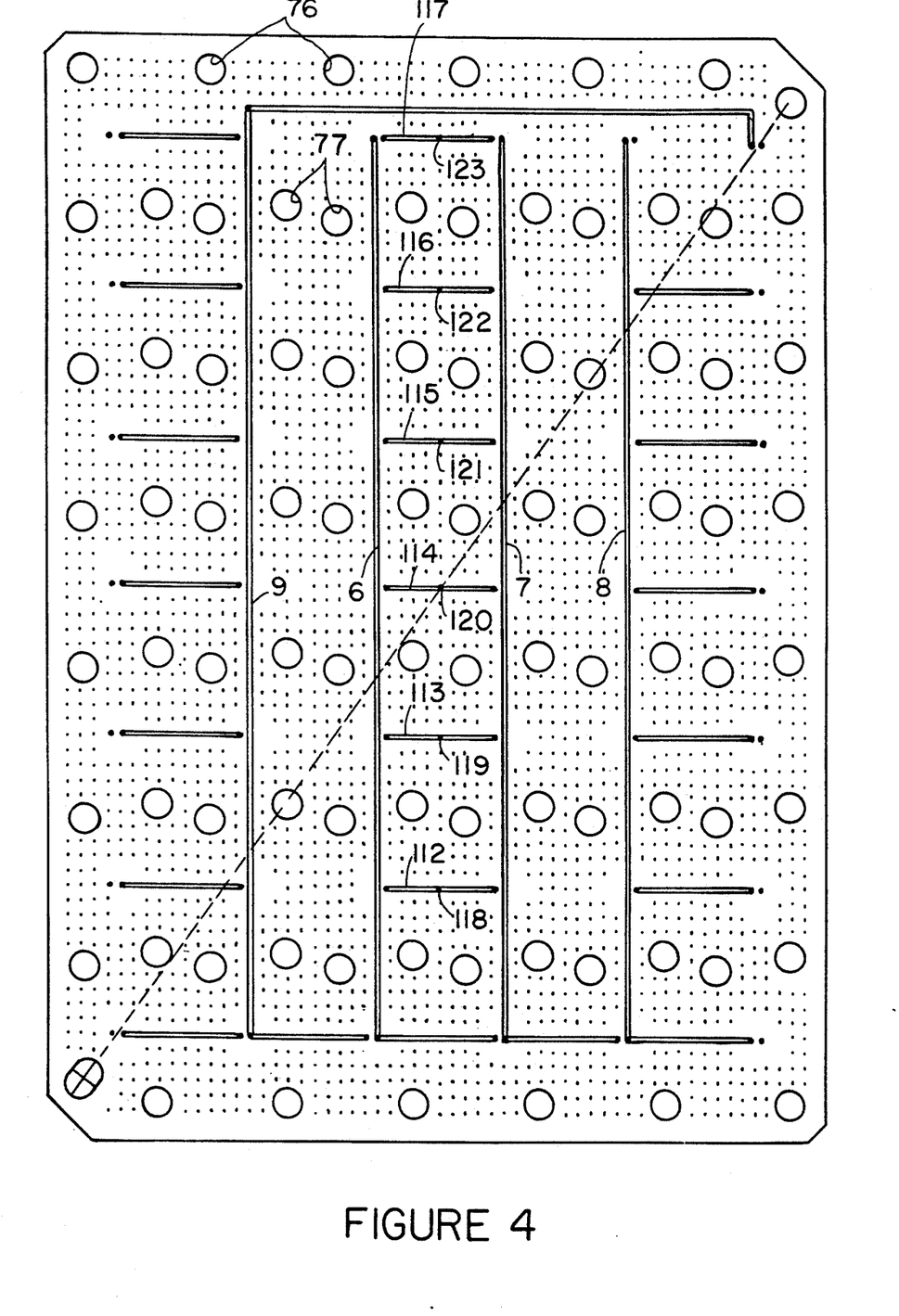
FIG. 4 is a top view, of an alternative embodiment of a solid plate structure formed from three, four or five layers.

Referring to FIG. 4, an alternative construction of this invention is shown which can accommodate twelve treatment reservoirs. A first reaction train 8 and a second reaction train 9 are in fluid communication with a first partition train 7 and a second partition train 6. The trains 6 or 7 are divided by the apparatus shown in FIG. 3 into conduits 112, 113, 114, 115, 116 or 117 and holes 118, 119, 120, 121, 122 or 123 which are each connected to a treatment reservoir (not shown) in the manner discussed above with reference to FIG. 1.

This embodiment can be formed from three or four layers with the inner layer (Figure K) being eliminated. This construction can be formed of three layers with the conduits positioned in one layer or of four layers since the orthogonal positioned conduits do not interact with each other.

Referring to FIG. 4, alternative construction of this invention is shown which can accommodate six treatment reservoirs. A first reaction train 8 and a second reaction train 9 are in fluid communication with a first partition train 7 and a second partition train 6. The effluent from partition trains 6 or 7 are directed by the apparatus shown in or 117 and holes 118, 119, 120, 121, 122 or 123 which are each connected to a treatment reservoir (not shown) in the manner discussed above with reference to FIG. 1.

I claim:

1. In a system for directing a plurality of fluids in sequence to a treatment reservoir, a laminated plate means which comprises:
   a plurality of laminated layers,
   a first set of internal conduits enclosed by said plate means,
   a second set of internal conduits enclosed by said plate means, an internal layer positioned to separate a plurality of said first set of internal conduits from a plurality of said second set of conduits,
   holes extending through said plate means for providing fluid communication between said first set of internal conduits and said second set of internal conduits;
   and, means on said plate for attaching fluid pumping means to an outside surface of said plate to effect fluid transfer between said first set of internal conduits and said second set of internal conduits via said holes.

2. A laminated plate means comprising of plurality of layers laminated together, said plate means having a plurality of internal conduits enclosed by said layers, a first set of holes for providing fluid communication with fluid pumping means secured to an outside surface of said plate means between said internal conduits,
   and a second set of holes extending through the thickness of said plate means for effecting vapor transfer through said plates, said second set of holes not being in fluid communication with said first set of holes or said internal conduits.

3. The plate means of claim 1 formed from five layers.

4. The plate means of claim 1 formed from four layers.

5. The plate means of claim 1 formed from three layers.

6. The plate means of claim 1 wherein said first set of internal conduits extend in a direction perpendicular to the direction in which said second set of internal conduits extend.

7. The plate means of claim 3 wherein said first set of internal conduits extend in a direction perpendicular to the direction in which said second set of internal conduits extend.

8. The plate means of claim 4 wherein said first set of internal conduits extend in a direction perpendicular to the direction in which said second set of internal conduits extend.

9. The plate means of claim 5 wherein said first set of internal conduits extend in a direction perpendicular to the direction in which said second set of internal conduits extend.

10. A laminated plate means comprising a plurality of layers laminated together, said plate means having a plurality of internal conduits enclosed by said layers, a first set of holes for providing fluid communication with fluid pumping means secured to an outside surface of said plate means between said internal conduits,
    and a second set of holes extending through a portion of the thickness of said plate means for effecting vapor transfer through said plates, said second set of holes not being in fluid communication with said first set of holes or said internal conduits wherein only one of said layers is free of said second set of holes.

11. The plate means of claim 10 formed from five layers.

12. The plate means of claim 10 formed from four layers.

13. The plate means of claim 10 formed from three layers.

14. The plate means of claim 10 wherein said first set of internal conduits extend in a direction perpendicular to the direction in which said second set of internal conduits extend.

15. The plate means of claim 11 wherein said first set of internal conduits extend in a direction perpendicular to the direction in which said second set of internal conduits extend.

16. The plate means of claim 12 wherein said first set of internal conduits extend in a direction perpendicular to the direction in which said second set of internal conduits extend.

17. The plate means of claim 13 wherein said first set of internal conduits extend in a direction perpendicular to the direction in which said second set of internal conduits extend.

* * * * *